US010636398B2

(12) United States Patent
Lee et al.

(10) Patent No.: US 10,636,398 B2
(45) Date of Patent: Apr. 28, 2020

(54) WEARABLE ELECTRONIC DEVICE AND METHOD FOR CONTROLLING APPLICATION BEING EXECUTED IN ELECTRONIC DEVICE

(71) Applicant: Samsung Electronics Co., Ltd., Gyeonggi-do (KR)

(72) Inventors: Min Hee Lee, Seoul (KR); Tae Min Cho, Gyeonggi-do (KR); Soo Jung Bae, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/767,054

(22) PCT Filed: Oct. 7, 2016

(86) PCT No.: PCT/KR2016/011267
§ 371 (c)(1),
(2) Date: Apr. 9, 2018

(87) PCT Pub. No.: WO2017/061827
PCT Pub. Date: Apr. 13, 2017

(65) Prior Publication Data
US 2018/0301128 A1   Oct. 18, 2018

(30) Foreign Application Priority Data

Oct. 7, 2015  (KR) ........................ 10-2015-0140922

(51) Int. Cl.
*G10H 1/00* (2006.01)
*G06F 3/01* (2006.01)
(Continued)

(52) U.S. Cl.
CPC ........... *G10H 1/0008* (2013.01); *G06F 1/163* (2013.01); *G06F 3/017* (2013.01); *G06F 3/0346* (2013.01);
(Continued)

(58) Field of Classification Search
CPC ...... G06F 3/0487; G06F 3/0488; G06F 3/017; G06F 3/0362; G06F 1/163; G06F 3/0346;
(Continued)

(56) References Cited

U.S. PATENT DOCUMENTS 6,556,222 B1 *  4/2003  Narayanaswami .. G04G 9/0064
                                                368/295
8,937,237 B2    1/2015  Little et al.
(Continued)

FOREIGN PATENT DOCUMENTS

KR   1020110065603   6/2011
KR   1020140141300   12/2014
(Continued)

OTHER PUBLICATIONS

Dan White. "The Latest Motion Control Technology for DJs—DJ TechTools", Internet, XP055490509, Sep. 5, 2013, 6 pages.
(Continued)

*Primary Examiner* — Charles V Hicks
(74) *Attorney, Agent, or Firm* — The Farrell Law Firm, P.C.

(57) ABSTRACT

Various examples of the present invention relate to a wearable electronic device, comprising: a communication circuit for implementing communication; a sensor circuit for sensing a movement of the wearable electronic device; and a processor electrically connected to the communication circuit and the sensor circuit, wherein the processor transmits, through the communication circuit to the electronic device, movement data of the wearable electronic device acquired through the sensor circuit, and the transmitted movement data of the wearable electronic device enables the electronic device to control a loop application being executed in the electronic device. In addition, other examples, which can be identified through the description, are possible.

13 Claims, 16 Drawing Sheets

(51) Int. Cl.
*G06F 3/0346* (2013.01)
*G06F 1/16* (2006.01)
*G06F 3/0487* (2013.01)
*G06F 3/0488* (2013.01)
*G06F 3/0362* (2013.01)

(52) U.S. Cl.
CPC .......... *G06F 3/0362* (2013.01); *G06F 3/0487* (2013.01); *G06F 3/0488* (2013.01); *G10H 2220/116* (2013.01); *G10H 2220/201* (2013.01); *G10H 2220/401* (2013.01)

(58) Field of Classification Search
CPC .......... G10H 2220/401; G10H 1/0008; G10H 2220/116; G10H 2220/201
See application file for complete search history.

(56) References Cited

U.S. PATENT DOCUMENTS

| | | | |
|---|---|---|---|
| 8,940,992 | B2 | 1/2015 | Little et al. |
| 8,983,539 | B1 | 3/2015 | Kim et al. |
| 8,994,827 | B2 | 3/2015 | Mistry et al. |
| 9,030,446 | B2 | 5/2015 | Misty et al. |
| 9,033,024 | B2 | 5/2015 | Prest et al. |
| 9,129,584 | B2 | 9/2015 | Little et al. |
| 9,195,219 | B2 | 11/2015 | Hong et al. |
| 9,224,378 | B2 | 12/2015 | Little et al. |
| 9,418,645 | B2 | 8/2016 | Little et al. |
| 9,477,313 | B2 | 10/2016 | Mistry et al. |
| 9,524,699 | B2 | 12/2016 | Choi et al. |
| 9,568,891 | B2 | 2/2017 | Adams et al. |
| 2002/0024506 | A1 * | 2/2002 | Flack .................. G06F 1/1626 345/169 |
| 2014/0007983 | A1 | 1/2014 | Prest et al. |
| 2014/0083279 | A1 | 3/2014 | Little et al. |
| 2014/0083280 | A1 | 3/2014 | Little et al. |
| 2014/0106677 | A1 | 4/2014 | Altman |
| 2014/0137721 | A1 | 5/2014 | Little et al. |
| 2014/0139422 | A1 | 5/2014 | Mistry et al. |
| 2014/0139454 | A1 | 5/2014 | Mistry et al. |
| 2014/0139486 | A1 | 5/2014 | Mistry et al. |
| 2014/0139637 | A1 | 5/2014 | Mistry et al. |
| 2014/0143678 | A1 | 5/2014 | Mistry et al. |
| 2014/0143737 | A1 | 5/2014 | Mistry et al. |
| 2014/0143784 | A1 | 5/2014 | Mistry et al. |
| 2014/0143785 | A1 | 5/2014 | Mistry et al. |
| 2015/0049591 | A1 | 2/2015 | Adams et al. |
| 2015/0085621 | A1 | 3/2015 | Hong et al. |
| 2015/0116217 | A1 | 4/2015 | Choi et al. |
| 2015/0154949 | A1 | 6/2015 | Little et al. |
| 2015/0181087 | A1 | 6/2015 | Mistry et al. |
| 2015/0252452 | A1 | 9/2015 | Prest et al. |
| 2015/0348526 | A1 | 12/2015 | Little et al. |
| 2016/0062572 | A1 * | 3/2016 | Yang .................. G06F 3/0488 715/835 |
| 2016/0170490 | A1 * | 6/2016 | Lee .................. G06F 3/017 345/156 |
| 2016/0349803 | A1 * | 12/2016 | Dusan .................. G04C 3/002 |
| 2018/0059809 | A1 * | 3/2018 | McClendon .......... G06F 3/0346 |
| 2018/0308202 | A1 * | 10/2018 | Appu .................. G06T 1/20 |

FOREIGN PATENT DOCUMENTS

| | | |
|---|---|---|
| KR | 1020150047309 | 5/2015 |
| WO | WO 2014062714 | 4/2014 |
| WO | WO 2015111790 | 7/2015 |
| WO | WO 2015/122879 | 8/2015 |

OTHER PUBLICATIONS

Anonymous: "Music Performance using Soundcamp Looper and Gear S2", Youtube, Internet, XP054978438, Oct. 7, 2015, 1 page.
European Search Report dated Sep. 3, 2018 issued in counterpart application No. 16853943.5-1216, 13 pages.
PCT/ISA/210 Search Report issued on PCT/KR2016/011267 (pp. 9).
PCT/ISA/237 Written Opinion issued on PCT/KR2016/011267 (pp. 7).
European Search Report dated Dec. 21, 2018 issued in counterpart application No. 16853943.5-1216, 12 pages.

* cited by examiner

WEARABLE ELECTRONIC DEVICE AND METHOD FOR CONTROLLING APPLICATION BEING EXECUTED IN ELECTRONIC DEVICE

PRIORITY

This application is a National Phase Entry of PCT International Application No. PCT/KR2016/011267 which was filed on Oct. 7, 2016, and claims priority to Korean Patent Application No. 10-2015-0140922, which was filed on Oct. 7, 2015, the content of each of which is incorporated herein by reference.

TECHNICAL FIELD

Various embodiments of the present invention relate to a wearable device (e.g., a smart watch) and a method for controlling an application executed in an electronic device.

BACKGROUND ART

As information and communication technologies have been developed, network devices, such as a base station, have been installed across the nation and an electronic device allows a user to freely use a network anywhere in the country by transmitting or receiving data with another electronic device through the network.

Various types of electronic devices have provided various functions according to the latest trend of digital convergence. For example, a smartphone supports access to the Internet through the network and supports a healthcare function, a reproduction function of music or a video, or a capturing function of a photo or a moving picture using an image sensor, in addition to the use of making a call.

Further, in the electronic device, to effectively provide the above-described convenient functions to a user, various user interface (UI) technologies have been developed. A graphic user interface (GUI) displayed on the electronic device is a representative example.

In addition, the electronic device may control another electronic device through a network or may be controlled by receiving a control signal from another electronic device through a network. Recently, the needs for the electronic device and the utilization thereof may be increased under the environment of a one-personal multi device (OPMD).

DETAILED DESCRIPTION OF THE INVENTION

Technical Problem

Various embodiments of the present invention are to provide wearable electronic devices and methods for controlling applications executed in the electronic devices. However, technical objects to be accomplished through various embodiments of the present invention are not limited thereto and other technical objects may be present.

Technical Solution

As technical means to accomplish the above objects, according to various embodiments of the present invention, a wearable electronic device may include a communication circuit to perform communication, a sensor circuit to sense movement of the wearable electronic device, and a processor electrically connected with the communication circuit and the sensor circuit. The processor may transmit movement data of the wearable electronic device, which is obtained through the sensor circuit, to an electronic device through the communication circuit. The transmitted movement data of the wearable electronic device may allow the electronic device to control a loop application, which is being executed in the electronic device.

As technical means to accomplish the above objects, according to various embodiments of the present invention, the method performed in the wearable electronic device may include obtaining movement data of the wearable electronic device, and transmitting the obtained movement data to an electronic device. The transmitted movement data of the wearable electronic device allows the electronic device to control a loop application, which is being executed in the electronic device.

As technical means to accomplish the above objects, according to various embodiments of the present invention, in a medium storing computer-readable instructions, which are executed by at least one processor and are readable by a computer, the instructions may cause the at least one processor to obtain movement data of the wearable electronic device and to transmit the obtained movement data to the electronic device. The transmitted movement data of the wearable electronic device may allow the electronic device to control the loop application executed in the electronic device.

Advantageous Effects of the Invention

According to at least one of the above-described technical means of the present invention, in the wearable electronic devices and the methods according to various embodiments of the present invention, the application executed in the electronic device may be controlled by the wearable electronic device, thereby providing the convenience for the user.

In addition, the continuous sound effects may be applied only by the movement in the state that the wearable device is put on and the intuitive UI applying the sound effect may be provided, thereby providing the convenience for the user.

BEST MODE

Figure 1:
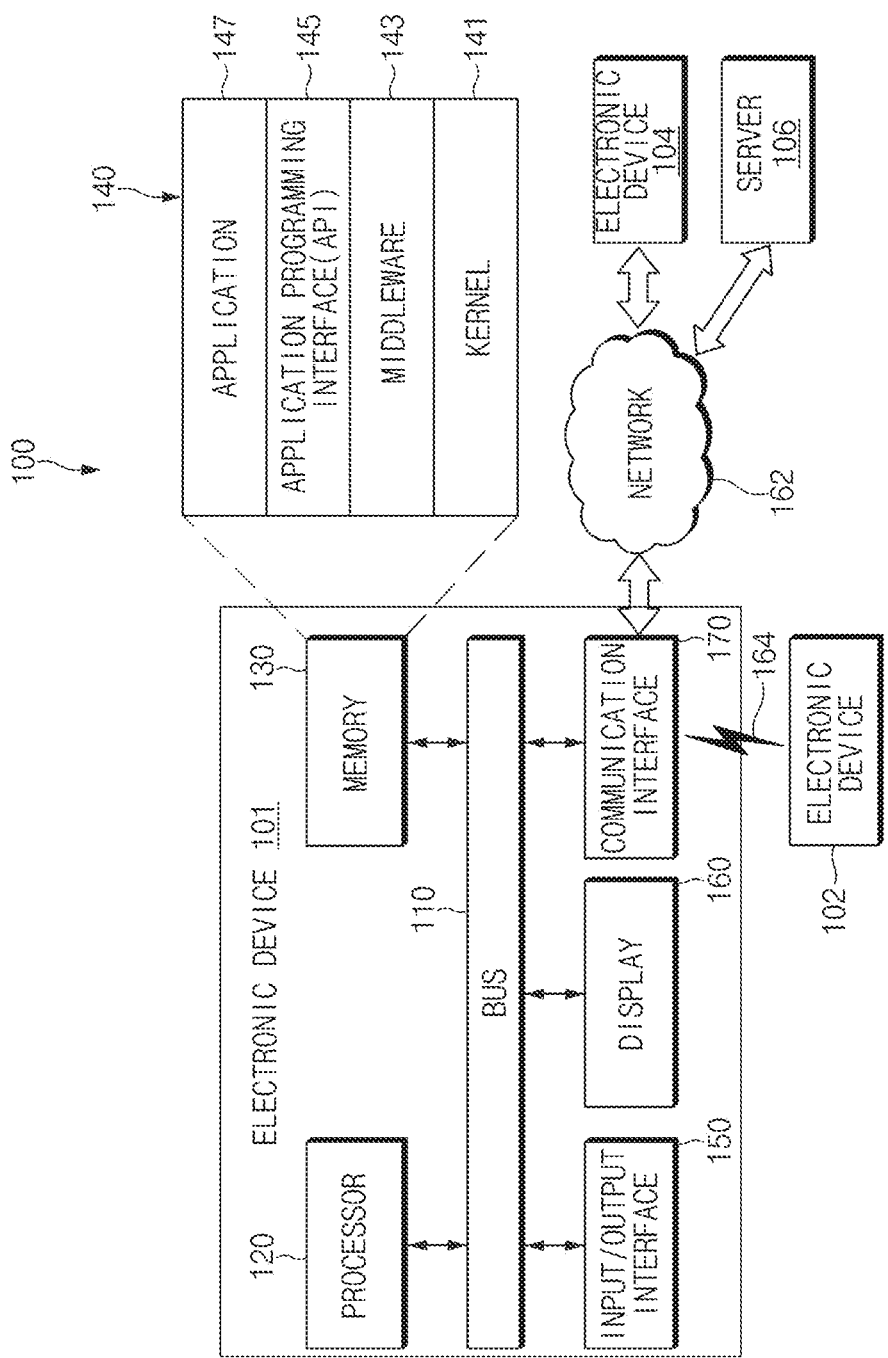
FIG. 1 is a diagram illustrating an electronic device in a network environment, according to various embodiments of the present invention.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like used may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in various embodiments may be used to refer to various elements regardless of the order and/or the priority but do not limit the elements. The expressions may be used to distinguish the relevant elements from other elements, For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMD), an electronic apparel, electronic bracelets, electronic necklaces, electronic appcessory, electronic tattoos, smart mirrors, or smart watches). According to various embodiments, the electronic device may be a smart home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Referring to FIG. 1, according to various embodiments, an electronic device 101 in a network environment 100 is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 120 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store commands or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. With regard to task requests received from the application program 147, the middleware 143 may perform the control (e.g., scheduling or load balancing) for the task requests by using a method of assigning the priority, which makes it possible to use a system resource (e.g., the bus 110, the processor 120, the memory 130, or the like) of the electronic device 101, to at least one of the application program 147.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other element(s) of the electronic device 101. Furthermore, the input/output interface 150 may output a command or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers.

According to various embodiments, all or a portion of operations that the electronic device 101 will perform may be executed by another or plural electronic devices (e.g., the electronic device 102, the electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
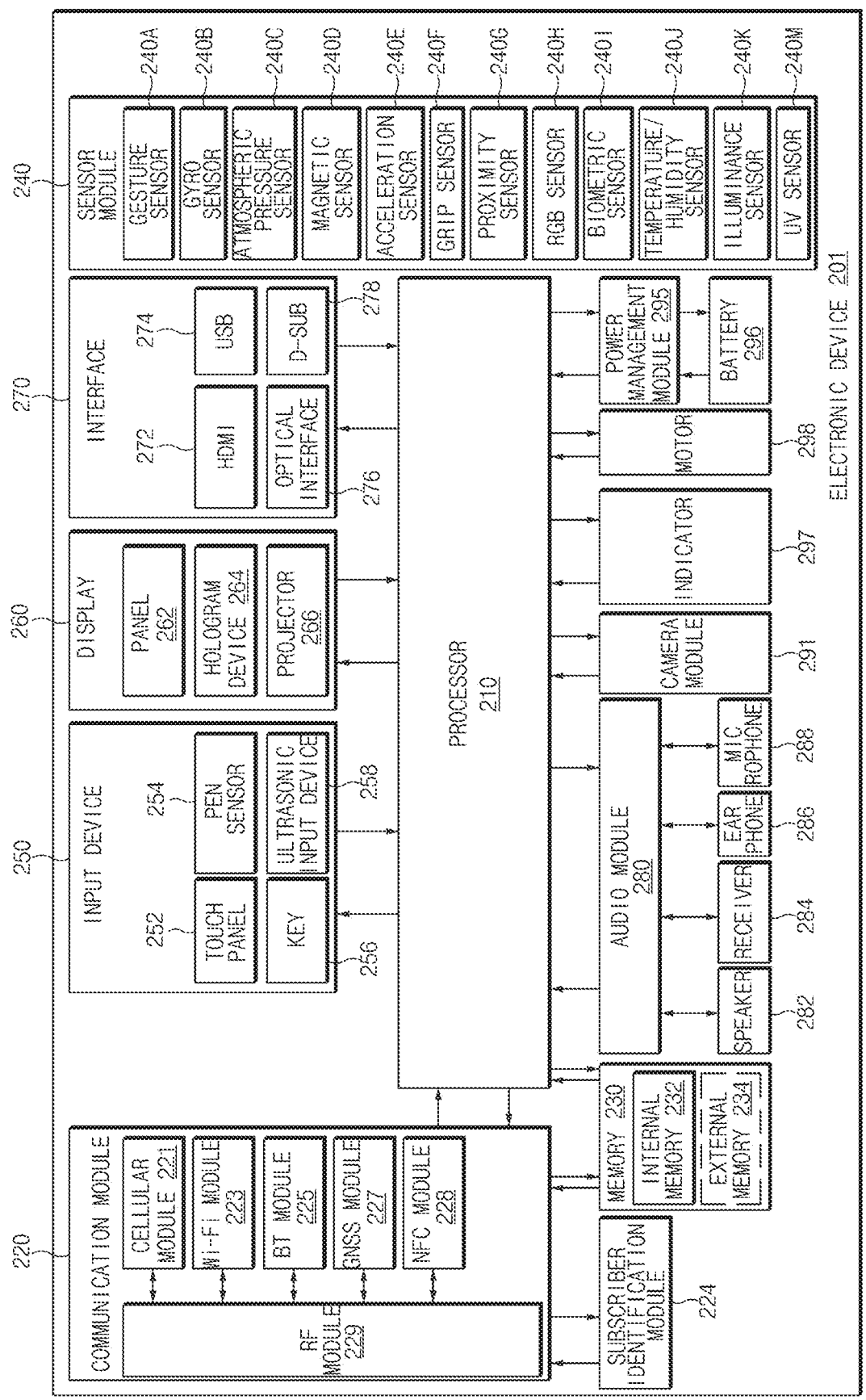
FIG. 2 is a block diagram of the electronic device, according to various embodiments of the present invention.

FIG. 2 illustrates a block diagram of an electronic device (201), according to various embodiments. The electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The AP 210 may drive, for example, an operating system (OS) or an application to control a plurality of hardware or software elements connected to the AP 210 and may process and compute a variety of data. For example, the AP 210 may be implemented with a System on Chip (SoC). According to an embodiment, the AP 210 may further include a graphic processing unit (GPU) and/or an image signal processor. The AP 210 may include at least a part (e.g., a cellular module 221) of elements illustrated in FIG. 2. The AP 210 may load a command or data, which is received from at least one of other elements (e.g., a nonvolatile memory), into a volatile memory and process the loaded command or data. The AP 210 may store a variety of data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GPS module 227, a near field communication (NFC) module 228, and a radio frequency (RF) module 229.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the AP 210 provides. According to an embodiment, the cellular module 221 may include a communication processor (CP).

Each of the Wi-Fi module 223, the BT module 225, the GPS module 227, or the NFC module 228 may include a processor for processing data exchanged through a corresponding module, for example. According to an embodiment, at least a part (e.g., two or more) of the cellular module 221, the Wi-Fi module 223, the BT module 225, the GPS module 227, or the NFC module 228 may be included within one Integrated Circuit (IC) or an IC package.

For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GPS module 227, or the NFC module 228 may transmit and receive an RF signal through a separate RF module.

The subscriber identification module 224 may include, for example, a card and/or embedded SIM that includes a subscriber identification module and may include unique identify information (e.g., integrated circuit card identifier (ICCID)) or subscriber information (e.g., integrated mobile subscriber identity (MI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the AP 210 or independent of the AP 210 and is configured to control the sensor module 240. The processor may control the sensor module 240 while the AP 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may verify data by detecting sound wave with a microphone (e.g., a microphone 288) in the electronic device 201 through an input device generating the ultrasonic signal The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the AP 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
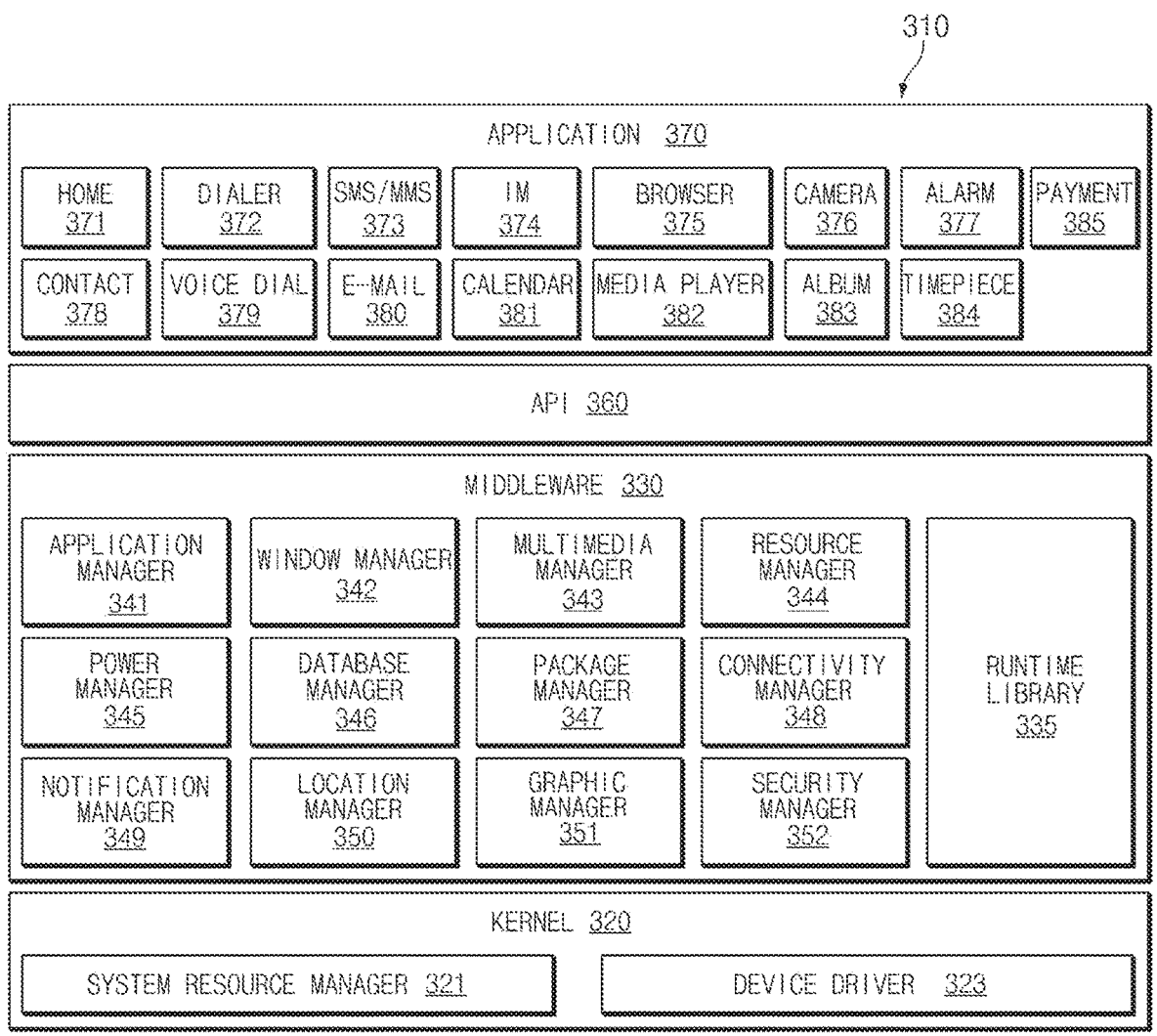
FIG. 3 is a block diagram of a program module, according to various embodiments of the present invention.

FIG. 3 illustrates a block diagram 300 of a program module 310, according to various embodiments. According to various embodiments, a program module 310 (e.g., the program 140 of FIG. 1) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, Bada™.

The program module 310 may include a kernel 320, a middleware 330, an application programming interface (API) 360, an application 370, and/or database 390. At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 and/or a device driver 323. The system resource manager 321 may perform control, allocation, or retrieval of system resources. According to various embodiments, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to various embodiments, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used on a screen. The multimedia manager 343 may identify a format necessary for playing media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify a database that is to be used in at least one application of the application 370. The package manager 347 may install or update an application that is distributed in the form of package file.

The connectivity manager 348 may manage, for example, wireless connection such as WiFi or Bluetooth. The notification manager 349 may display or notify an event such as arrival message, appointment, or proximity notification in a manner that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to various embodiments, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The API 360 may include a base access manager 361. The base access manager 361 may allow or reject the access of a health care application 385 to the health information 391 when the health care application 385 requests for the access to the health information 391. In addition, when the health care application 385 requests for the access (acquisition) to the health information 391, the database access manager 361 may request for the health information 391 from the database manager 345.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, or a timepiece 384 or for offering health care (e.g., measuring an exercise quantity, blood sugar, or the like) or environment information (e.g., information of barometric pressure, humidity, temperature, or the like).

According to various embodiments, the application 370 may include an application (hereinafter referred to as "information exchanging application" for descriptive convenience) to support information exchange between an electronic device (e.g., the electronic device 101) and an external electronic device (e.g., the electronic device 102 or the electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or the electronic device 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to various embodiments, the application 370 may include an application (e.g., a health care application of a mobile medical device) that is assigned in accordance with an attribute of an external electronic device (e.g., the electronic device 102, the electronic device 104, or the server 106). According to various embodiments, the application 370 may include an application that is received from an external electronic device (e.g., the electronic device 102, the electronic device 104, or the server 106). According to various embodiments, the application 370 may include an application that is a preloaded application or a third party application that is downloadable from a server. The names of elements of the program module 310 according to the embodiment may be modifiable depending on kinds of operating systems.

The database 390 may include health information 391 and may transmit the health information 391 to the health care application 385 based on the request of the database manager 346.

According to various embodiments, at least a portion of the program module 310 may be implemented by software, firmware, hardware, or a combination of two or more thereof. At least a portion of the program module 310 may be implemented (e.g., executed), for example, by the processor (e.g., the AP 210). At least a portion of the program module 310 may include, for example, modules, programs, routines, sets of instructions, processes, or the like for performing one or more functions.

According to various embodiments, the program module 310 may display a service indication corresponding to a service provided by the health care application 385 and health information indication corresponding to the relevant health information 391. If the program module 310 recognizes the acquisition of the input for the service indication, the health care application 385 may request for the access authority for the health information 391 from the database access manager 361 in response to the input.

Figure 4:
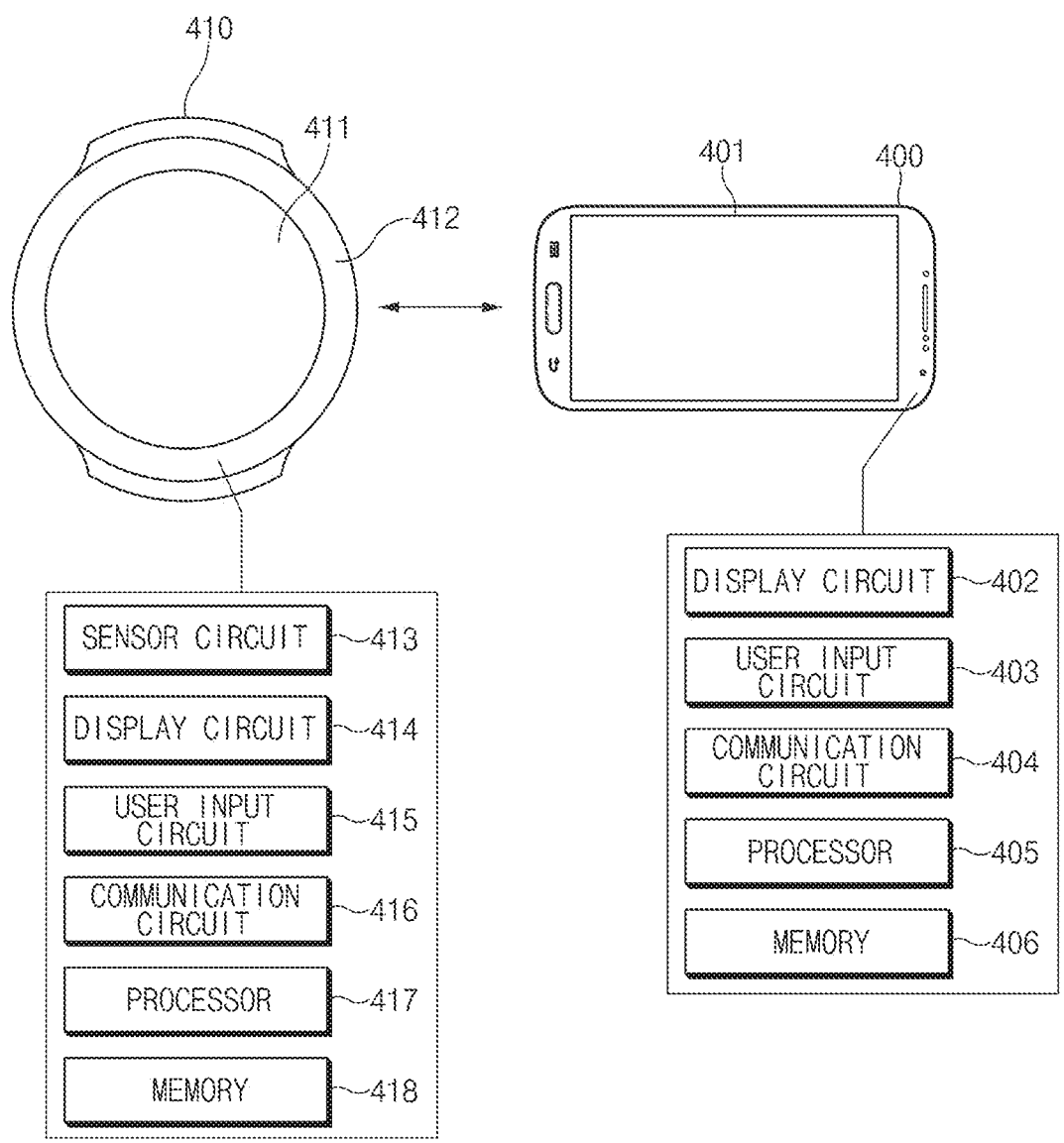
FIG. 4 is a block diagram illustrating an electronic device executing an application and a wearable electronic device controlling the electronic device, according to various embodiments of the present invention.

FIG. 4 is a block diagram illustrating an electronic device executing an application and a wearable electronic device controlling the electronic device, according to various embodiments of the present invention.

Referring to FIG. 4, an electronic device 400 may include a display 401, a display circuit 402, a user input circuit 403, a communication circuit 404, a processor 405, and a memory 406. In addition, a wearable electronic device 410 may include a display 411, a bezel 412, a sensor circuit 413, a display circuit 414, a user input circuit 415, a communication circuit 416, a processor 417, and a memory 418.

The configuration of the electronic device 400 and the wearable electronic device 410 illustrated in FIG. 4 is only one embodiment of the present invention and may have various modifications. For example, the electronic device 400 and the wearable electronic device 410 may further include a user interface to receive any command or information from a user. In this case, the user interface may be an input device, such as a keyboard, a mouse, or the like. In addition, the user interface may be a graphic user interface (GUI) displayed on the display 401 of the electronic device 400 and the display 411 of the wearable electronic device 410.

The display circuit 402 may provide various types of content (e.g., an application execution screen, a text, an image, a video, an icon, a symbol, or the like) through the display 401 of the electronic device 400. The display 401 may include, for example, a liquid crystal display (LCD), a light emitting diode (LED) display, an organic LED (OLED) display, a microelectromechanical systems (MEMS) display, an electronic paper display, or the like.

The user input circuit 403 may process various inputs or information received from the outside. According to various embodiments of the present invention, the user input circuit 403 may include a touch IC. For example, the user input circuit 403 may process a user input which is input from the user. The user input may be a touch input based on the finger of the user or a stylus (e.g., an electronic pen). In addition, the user input may include, for example, a hover input for providing an input through an electric change although the user's finger or the stylus does not directly contact the screen.

The user input circuit 403 may process various types of user inputs by distinguishing the user inputs therebetween. The type of the user input may include, for example, a touch down, a touch drag (or touch move), a touch release, a touch hold (or a long press), a drag and drop, and the like.

The communication circuit 404 may transmit or receive data together with the outside through the antenna of the electronic device 400. For example, the electronic device 400 may transmit or receive data together with the wearable electronic device 410 through the communication circuit 404 In this case, a network used for the communication between the electronic device 400 and the wearable electronic device 410 is a short range wireless network, for example, near field communication (NFC), Bluetooth (BT), Zigbee, or the like.

The processor 405 may be implemented with, for example, a system on chip (SoC) and may include one or more of a central processing unit (CPU), a graphic processing unit (GPU), an image signal processor, an application processor (AP), or a communication processor (CP). The processor 405 may load and process a command or data received from at least one of other elements (e.g., the display circuit 402, the user input circuit 403, and the communication circuit 404) from the memory 406 and may store various types of data in the memory 406.

The processor 405 may execute a loop application. The processor 405 may repeatedly play at least one instrument selected based on a user input through the loop application. In this case, the processor 405 may store at least one instrument selected based on the user input such that the at least one instrument is loaded by the user thereafter. The loop application may store mutually different instrument settings and may store several preset storage slots such that instrument settings desired by the user are loaded if necessary.

In addition, the processor 405 may play the at least one instrument by employing a sound effect, which is selected based on a user input, to the at least one instrument repeatedly played through the loop application. For example, the loop application may employ mutually different sound effects depending on positions of a pointer displayed as one point on a two dimension (2D) plane is selected through a user input.

The processor 405 may receive a control signal, which is used to control the loop application, from the wearable electronic device 410 through the communication circuit 404. The control signal may be to change a preset storage slot in which the instrument settings are stored. In addition, the control signal may be to change the sound effect for the instrument settings.

Further, the control signal may be to mutually switch from an application screen for the instrument settings to an application screen employing the sound effects, on the loop application.

The processor 405 may change a preset in which the instrument repeatedly played is set, change a sound effect to be employed, and mutually switch from the application screen for the instrument settings to the application screen employing the sound effects in response to the control signal received from the wearable electronic device 410

The memory 406 may store data, for example, instructions for operations performed by the processor 405. In this case, the data stored in the memory 406 may include data input and output between elements inside the electronic device 400 and may include data input and output between the electronic device 400 and elements outside the electronic device 400.

According to various embodiments of the present invention, the memory 406 may include an embedded memory or an external memory. For example, the embedded memory may include at least one of a volatile memory (e.g., a dynamic RAM (DRAM), a static RAM (SRAM), a synchronous dynamic RAM (SDRAM), or the like), a non-volatile memory (e.g., a one-time programmable ROM (OTPROM), programmable ROM (PROM), erasable and programmable ROM (EPROM), EEPROM (electrically erasable and programmable ROM (EEPROM), a mask ROM, a flash ROM, a flash memory (e.g., NAND flash, or NOR flash, or the like), a hard disk drive (HDD), or a solid state drive (SSD).

For example, the external memory may further include a flash drive, for example, a compact flash (CF), a secure digital (SD), a micro-SD, a mini-SD, an extreme digital (xD), a MultiMediaCard (MMC), a memory stick, or the like. The external memory may be operatively and/or physically connected with the electronic device 400 through various interfaces.

Those skilled in the art may sufficiently understand that the display circuit 402, the user input circuit 403, the communication circuit 404, the processor 405, and the memory 406 are implemented in the electronic device 400 separately from each other or one or more thereof may be integrated with each other to be implemented.

Since the display circuit 414, the user input circuit 415, the communication circuit 416, the processor 417, and the memory 418 of the wearable electronic device 410 correspond to the display circuit 402, the user input circuit 403, the communication circuit 404, the processor 405, and the memory 406 of the above-described electronic device 400, the redundant details thereof will be omitted.

The sensor circuit 413 may sense the movement of the wearable electronic device 410 through various sensors included in the wearable electronic device 410. The sensor may include, for example, a gyro sensor or an acceleration sensor.

The user input circuit 415 may receive a touch input through the display 411. For example, the touch input may be a swipe input requesting for the mutual-switching between the application screen for the instrument settings and the application screen employing the sound effect. In addition, the touch input may be a swipe input for setting the activation/deactivation of the communication circuit 416. The user input may be made through the UI provided through the display 411 and may be made in the state that the display 411 which is turned off.

In addition, the user input circuit 415 may receive a bezel input by rotating the bezel 412. The bezel input may be made on the UI provided through the display 411 and may be made in the state that the display 411 is turned off.

The processor 417 may transmit the data on the movement of the wearable electronic device 410 sensed through the sensor circuit 413 to the electronic device 400 through the communication circuit 416. In addition, the processor 417 may transmit the user input, which is received through the user input circuit 415, to the electronic device 400 through the communication circuit 416.

The processor 417 may provide a wearing manner graphic user interface (UI) in which the wearing type of the wearable electronic device 410 is selected through the display circuit 414. Selection items to be selected through the wearing manner graphic UI may be whether the wearable electronic device 410 is present in the right hand or the left hand of the user. In addition, selection items to be selected through the wearing manner graphic UI may be whether the wearable electronic device 410 is put on the inner part of the wrist of the user, is put on the outer part of the wrist of the user, or is held by the hand of the user.

The processor 417 may receive the user input for selecting one wearing manner through the user input circuit 415 and may notify the selected wearing manner to the electronic device 400 through the communication circuit 416.

The processor 417 may provide objects, such as the number of presets which are selected in advance for a plurality of instruments in the loop application, which are selectable through the bezel input, to a UI through the display circuit 414. The details thereof will be made with reference to FIG. 7.

Those skilled in the art may sufficiently understand that the sensor circuit 413, the display circuit 414, the user input circuit 415, the communication circuit 416, the processor 417, and the memory 418 are implemented in the electronic device 400 separately from each other or one or more thereof may be integrated with each other to be implemented.

Figure 5A:
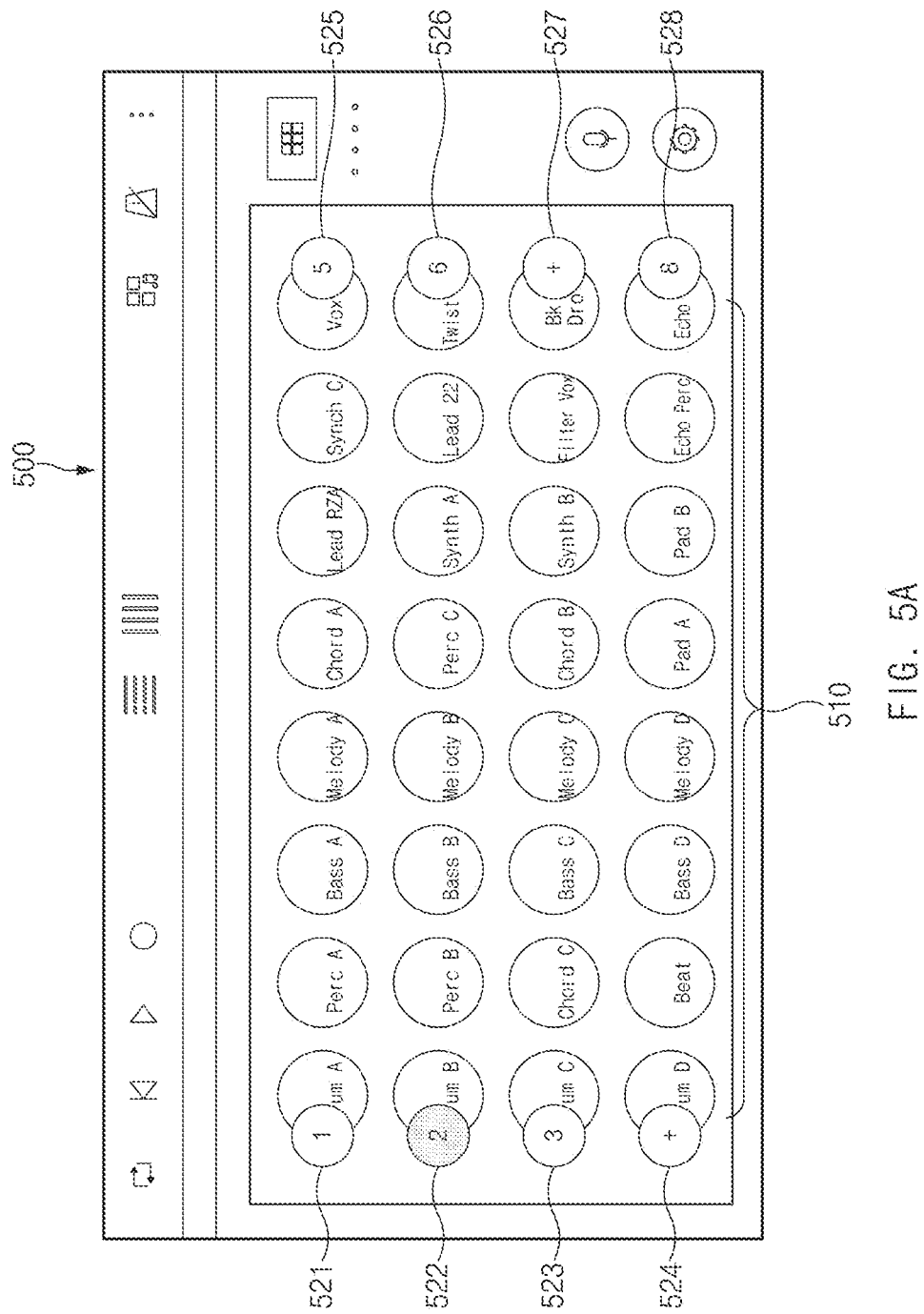
FIG. 5A is a first application screen provided through a loop application, according to various embodiments of the present invention.
Figure 5B:
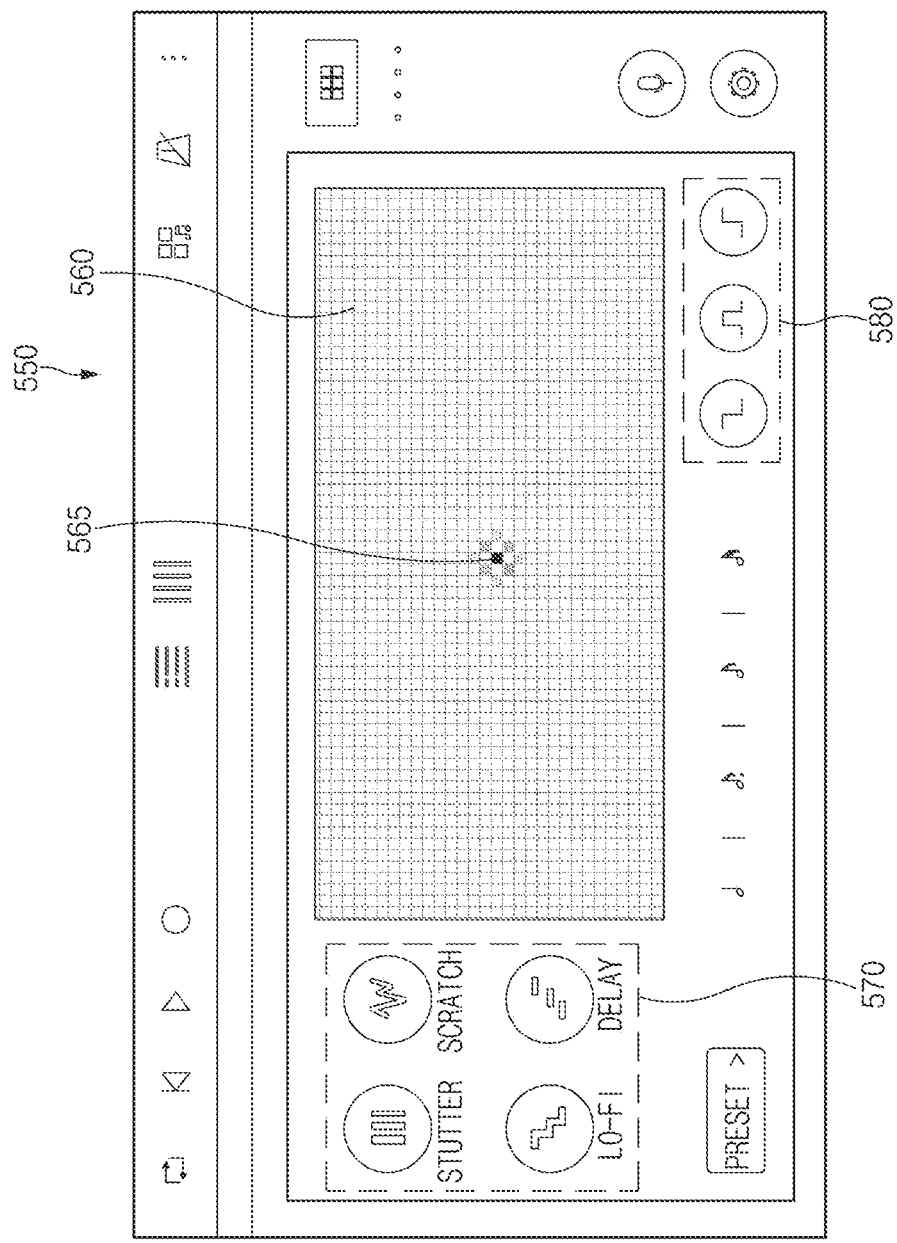
FIG. 5B is a second application screen provided through a loop application, according to various embodiments of the present invention.

FIG. 5A is a first application screen provided through the loop application, according to various embodiments of the present invention. FIG. 5B is a second application screen provided through a loop application, according to various embodiments of the present invention.

Referring to FIG. 5A, a first application screen 500 may include a region 510, in which a plurality of selectable instruments are arranged, and a first preset slot 521 to an eighth preset slot 528. The instrument selected from among the selectable instruments may be repeatedly played through the loop application.

Each of the first preset slot 521 to the eighth preset slot 528 may be a slot for storing at least one instrument selected to be repeatedly played, among the instruments arranged in the region 510.

Referring to FIG. 5A, remaining preset slots other than the fourth preset slot 524 and the seventh preset slot 527 among the first to eighth preset slots 521 to 528 are occupied. In addition, it may be understood that a preset slot currently selected by a user is the second preset slot 522.

Referring to FIG. 5B, a second application screen 550 may include a 2D plane 560, a sound effect type region 570, and a filter region 580 for setting the sound effect. The sound effect may be applied to at least one instrument determined to be repeatedly played on the first application screen 500. The sound effect may be changed a tone or a pitch of the sound effect determined through the sound effect type region 570.

Mutually different sound effects may be applied depending on the positions of the pointer 565 displayed by selecting one point selected on the 2D plane 560. For example, mutually different sound effects may be applied when the pointer 565 is positioned at the center of the 2D plane 560, the left side of the 2D plane 560, and the right side of the 2D plane 560. Similarly, mutually different sound effects may be applied when the pointer 565 is positioned at the center of the 2D plane 560, the upper end of the 2D plane 560, and the lower end of the 2D plane 560.

Figure 6A:
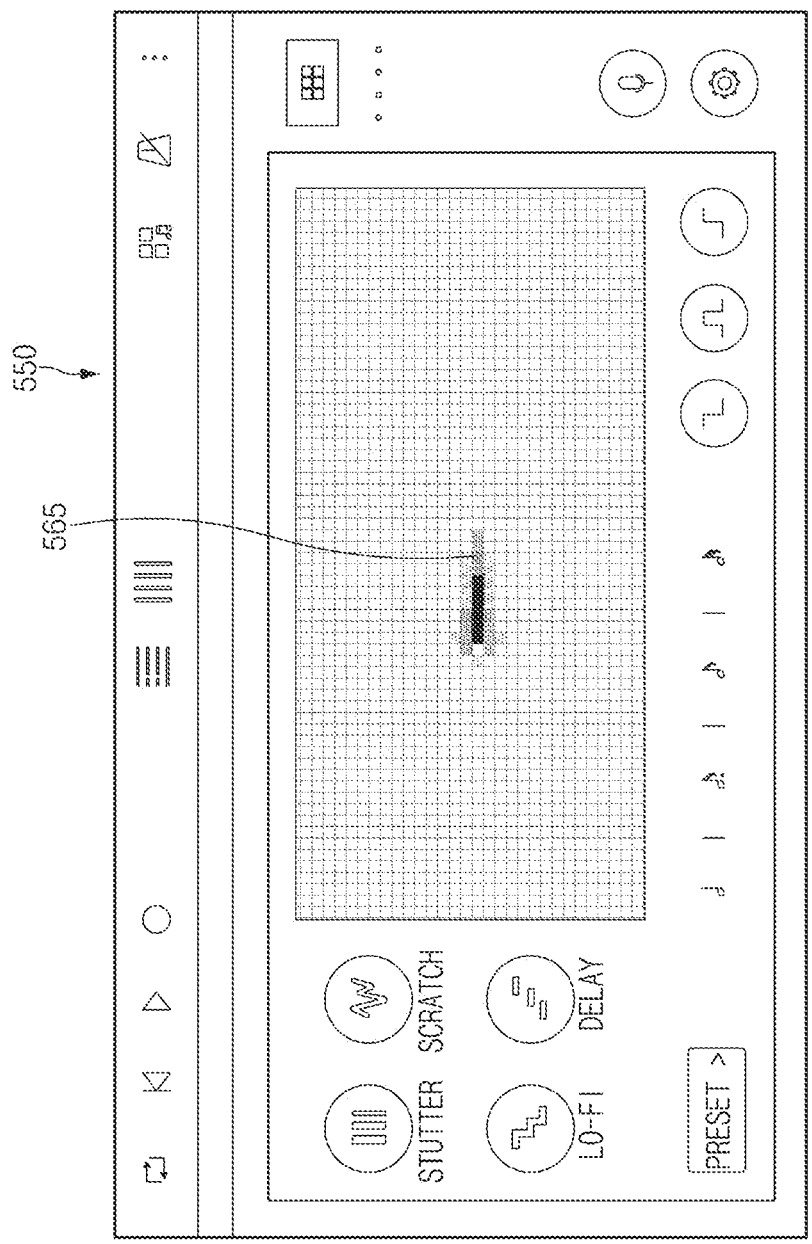
FIG. 6A is a view illustrating an operation of changing a preset slot on the first application screen of the loop application, according to various embodiments of the present invention.
Figure 6A:
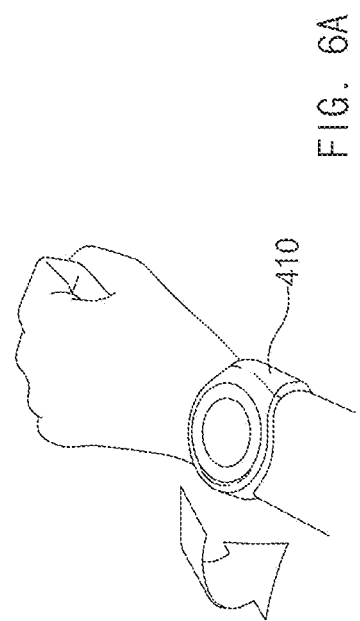

FIG. 6A is a view illustrating an operation of changing a preset slot on the first application screen of the loop application, according to various embodiments of the present invention.

The upper drawing of FIG. 6A illustrates the first application screen 500 of the loop application and the lower drawing of FIG. 6A illustrates the wearable electronic device 410 for controlling the first application screen 500.

Referring to FIG. 6A, the second preset slot 522, which is previously selected may be changed to the third preset slot 523, based on the bezel input made by rotating the bezel clockwise on the wearable electronic device 410. If the bezel is rotated counterclockwise on the wearable electronic device 410, the second preset slot, which is previously selected, may be changed to the first preset slot.

Figure 6B:
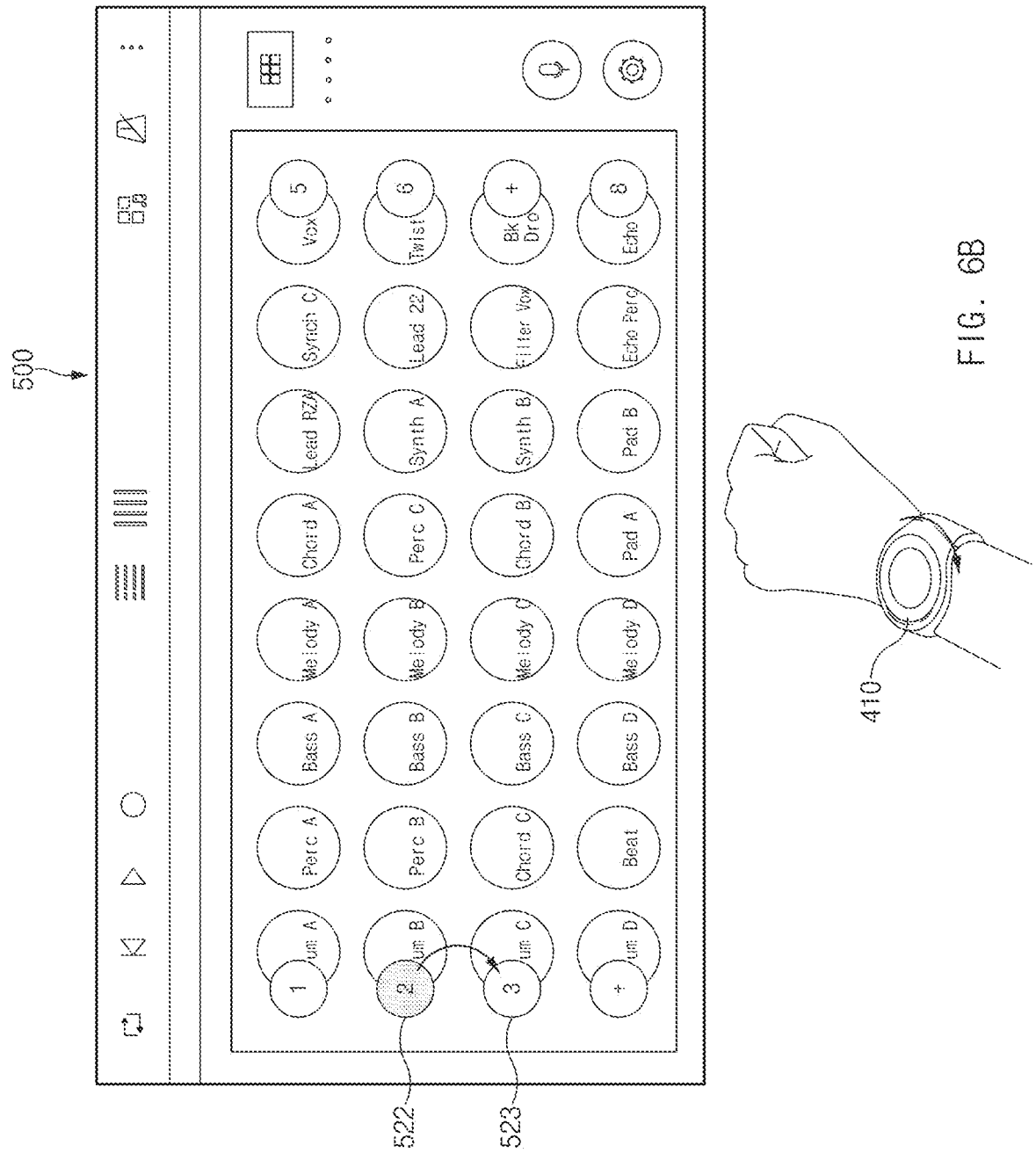
FIG. 6B is a view illustrating an operation of changing a sound effect to be employed by moving a pointer on the second application screen of the loop application, according to various embodiments of the present invention.

FIG. 6B is a view illustrating an operation of changing a sound effect to be employed by moving a pointer on the second application screen of the loop application, according to various embodiments of the present invention.

The upper drawing of FIG. 6B illustrates the second application screen 550 of the loop application and the lower drawing of FIG. 6B illustrates the wearable electronic device 410 for controlling the second application screen 550.

Referring to FIG. 6B, the pointer 565 may be moved leftward based on the movement of rotating the wearable electronic device 410 counterclockwise. As the pointer 565 moves leftward, the sound effects, which are applied to the instruments, determined on the first application screen 500, may be changed. Similarly, when the wearable electronic device 410 rotates clockwise, the pointer 565 may move rightward.

Figure 9:
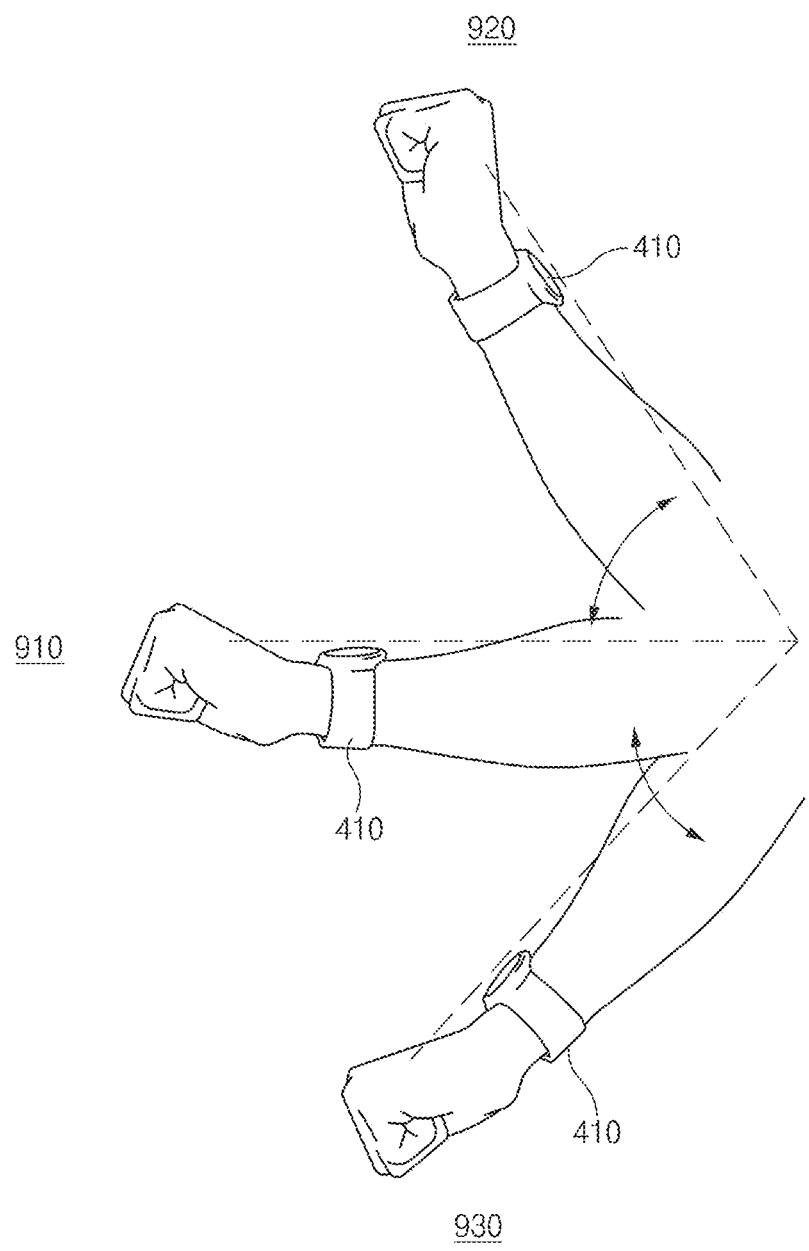
FIG. 9 is a view illustrating the movement of the wearable electronic device, according to various embodiments of the present invention.

When the user moves upward or downward the wearable electronic device 410 about the elbow of the user in the state of holding the wearable electronic device 410, the pointer 565 may move upward or downward (see FIG. 9).

In addition, since the wearable electronic device 410 may create movement data by using an acceleration sensor, the speed of moving leftward the pointer 565 may be determined in the electronic device 400, based on the acceleration of moving the wearable electronic device 410 counterclockwise. The same principle may be applied to the case of moving the wearable electronic device 410 upward or downward.

The electronic device 400 may perform an operation for reflecting the movement data, which is received from the wearable electronic device 410, on the 2D plane 560 of the second application screen 550.

Figure 6C:
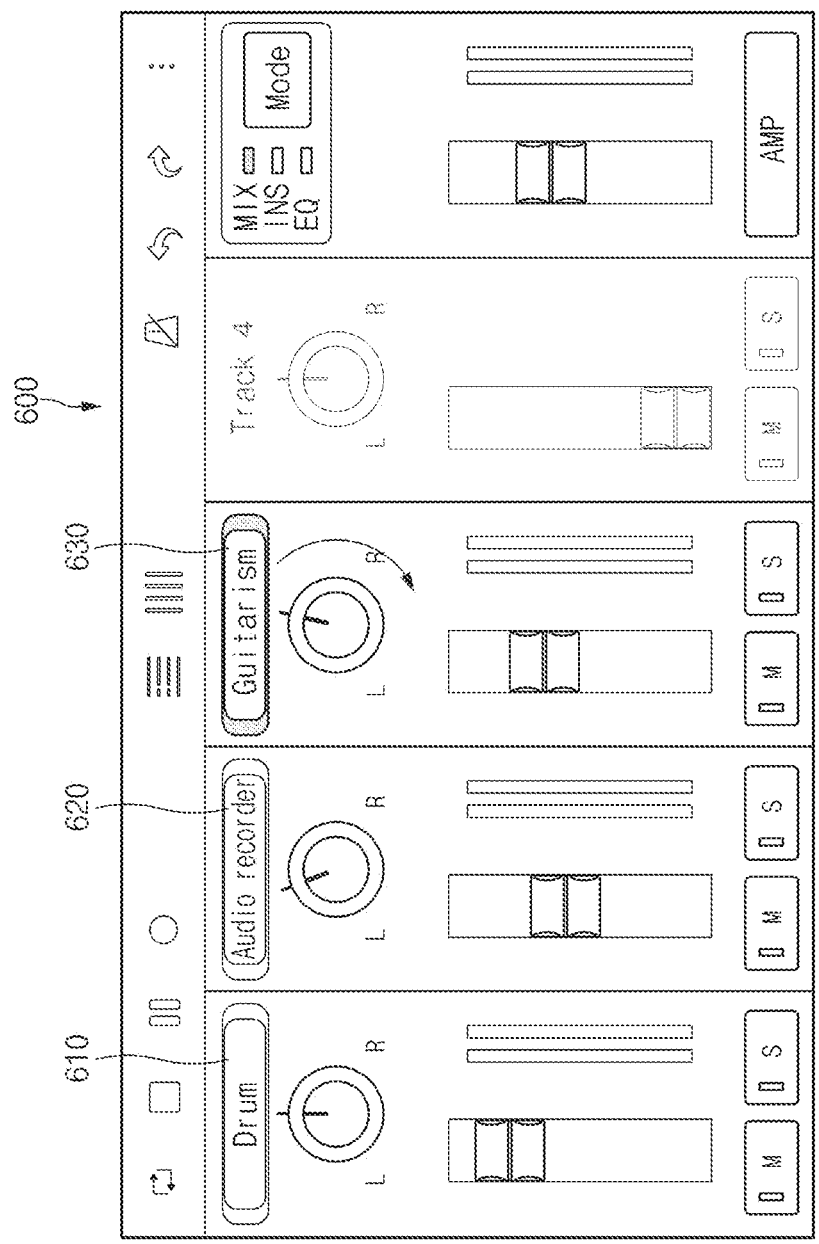
FIG. 6C is a view illustrating an operation of changing a sound effect through a bezel input on the third application screen of the loop application, according to various embodiments of the present invention.
Figure 6C:
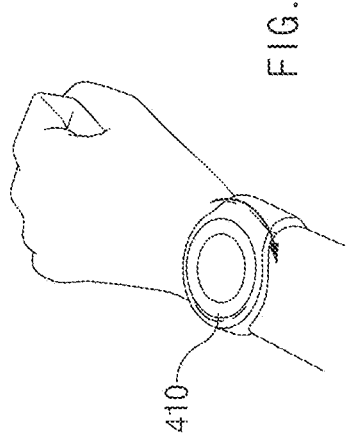

FIG. 6C is a view illustrating an operation of changing the sound effect through the bezel input on a third application screen of the loop application, according to various embodiments of the present invention.

A third application screen 600 of the loop application may be a screen in which the instruments are arranged such that detailed tuning of the instruments is possible. For example, the third application screen 600 may include a detailed tuning region 610 for a drum, a detailed tuning region 620 for an audio recorder, and a detailed tuning region 630 for a guitar.

For example, when the wearable electronic device 410 receives the bezel input, the electronic device 400 may display an indicator on any one of the detailed tuning region 610 for the drum, the detailed tuning region 620 for the audio recorder, and the detailed tuning region 630 for the guitar through the third application screen 600. For example, when a touch input to the display 411 of the wearable electronic device 410 is received in the state that the indicator is marked on the detailed tuning region 630 for the guitar, the electronic device 400 may select the detailed tuning region 630 for the guitar. In addition, when the bezel input is provided for the wearable electronic device 410, the electronic device 400 may turn a dial on the detailed tuning region 630 for the guitar on the third application screen 600.

Figure 6D:
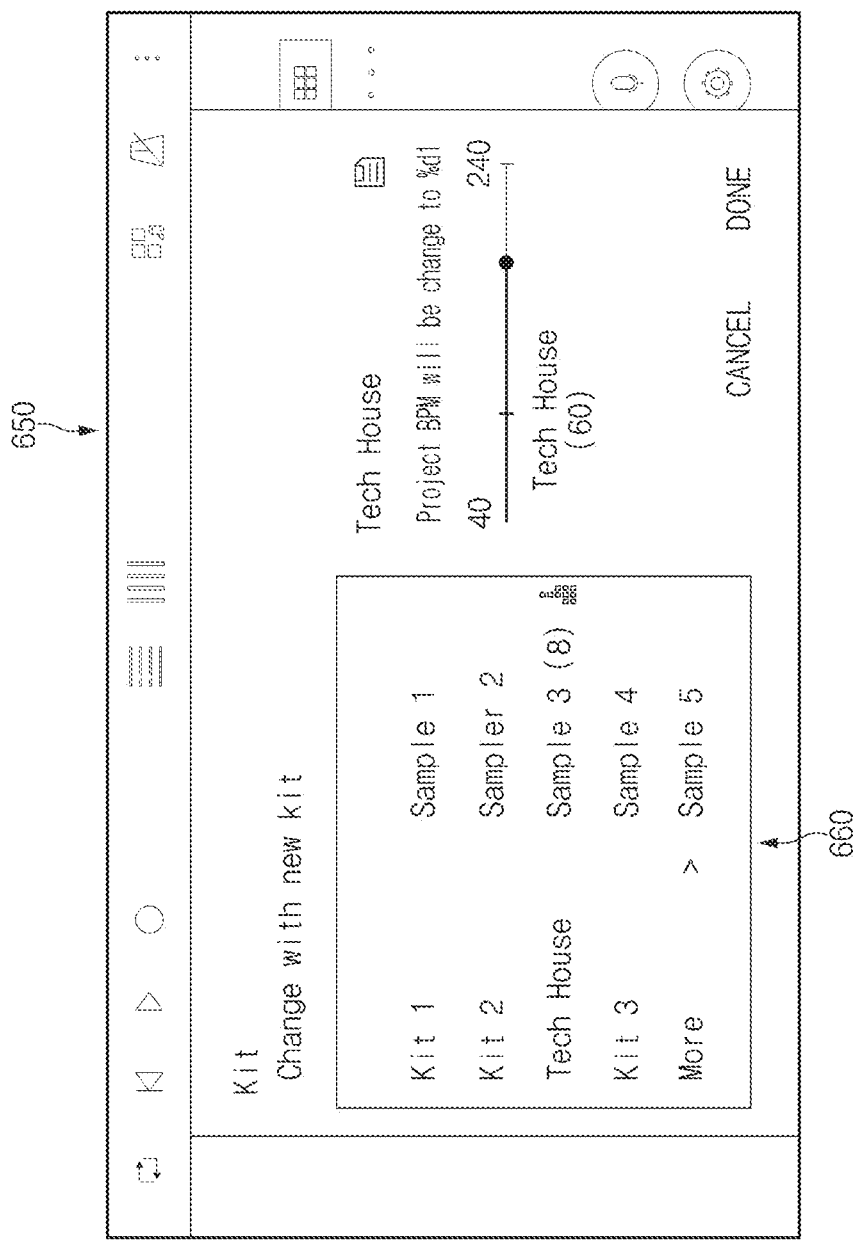
FIG. 6D is a view illustrating an operation of changing a sound effect through the bezel input on the fourth application screen of the loop application, according to various embodiments of the present invention.

FIG. 6D is a view illustrating an operation of changing a sound effect through the bezel input on the fourth application screen of the loop application, according to various embodiments of the present invention.

Referring to FIG. 6D, a plurality of kits may be arranged on a fourth application screen 650. The kit is to store a plurality of instruments displayed on the first application screen 500. For example, when a first kit is changed to a second kit through the fourth application screen 650, the instruments displayed on the first application screen 500 may be changed into other instruments. When the electronic device 400 receives a control signal, which is to change the kit, from the wearable electronic device 410, a sound sample pack may be changed to employ the kit corresponding to the control signal. The operation of changing the kit may be performed when the bezel input is received in the wearable electronic device 410.

One of a plurality of kits may be selected in a left region 660 of the fourth application screen 650. In the right region of the fourth application screen 650, the kit, for example, a Tech House kit, selected in the left region 660 may be adjusted in detail.

Figure 7:
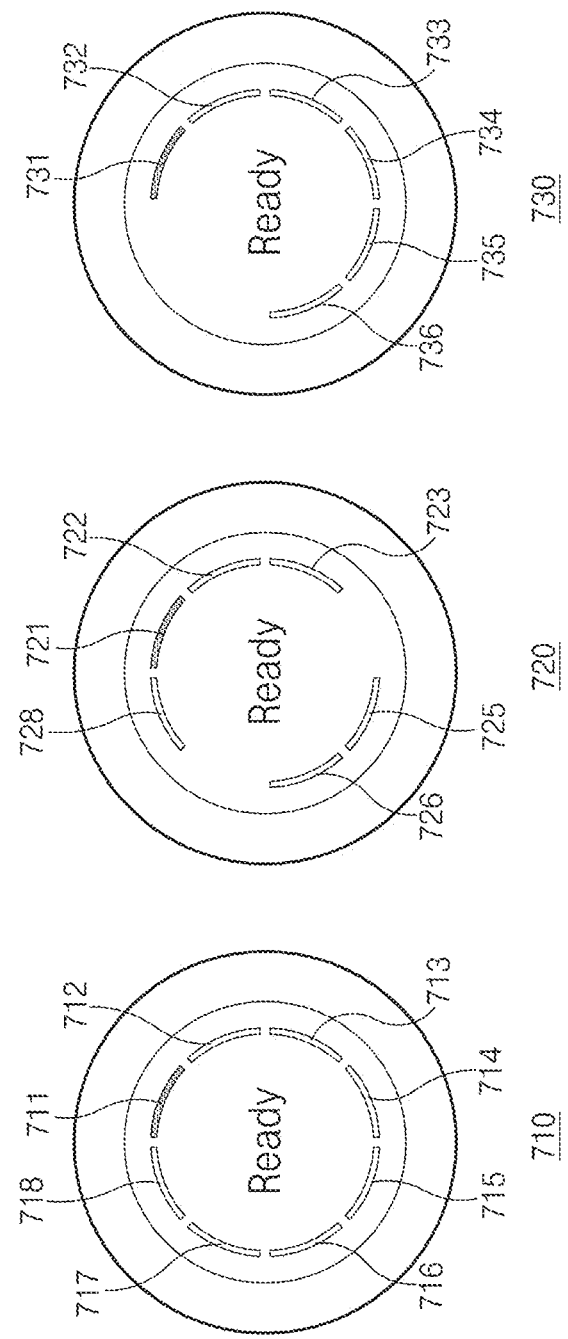
FIG. 7 is a view illustrating a UI provided through the display of the wearable electronic device, according to various embodiments of the present invention.

FIG. 7 is a view illustrating a UI provided through the display of the wearable electronic device, according to various embodiments of the present invention.

As recognized with reference to FIG. 5A, referring to the first application screen 500 of the loop application, the first application screen 500 may provide the first preset slot 521 to the eighth preset slot 528. Among them, the fourth preset slot 524 and the seventh preset slot 527 have never been set.

Referring to first embodiment 710 of FIG. 7, the UI may display all of a first indicator 711 to an eighth indicator 718. For example, the first indicator 711 to the eighth indicator 718 may correspond to the first preset slot 521 to the eighth preset slot 528.

In the first embodiment 710, the wearable electronic device 410 may sequentially select the first indictor 711 to the eighth indicator 718 through the bezel input. However, since nothing is stored in the preset slots corresponding to the fourth indicator 714 and the seventh indicator 717, when the wearable electronic device 410 receives the bezel input in the state that the third indicator 713 is selected, the wearable electronic device 410 may skip the fourth indicator 714 and select the fifth indicator 715. Alternatively, although the wearable electronic device 410 selects the fourth indicator 714, the wearable electronic device 410 may actually repeatedly play the instrument corresponding to the third preset slot 523 or may not play any instrument.

Referring to second embodiment 720 of FIG. 7, the UI may display the first indicator 721 to the third indicator 723, the fifth indicator 725, the sixth indicator 726, and the eighth indicator 728. For example, the first indicator 721 to the eighth indicator 728 may correspond to the first preset slot 521 to the eighth slot 528.

In the second embodiment 720, the wearable electronic device 410 does not display the fourth indicator 714 and the seventh indicator 717 corresponding to the fourth preset slot 524 and the seventh preset slot 527 which are vacant preset slots. Accordingly, when the wearable electronic device 410 receives the bezel input in the state that the third indicator 723 is selected, the fifth indicator 725 may be selected.

Referring to the first embodiment 730 of FIG. 7, the UI may display all the first indicator 731 to the sixth indicator 736. In this case, the first to third indicators 731 to 733 may correspond to the first to third preset slots 521 to 523. The fourth and fifth indicators 734 and 735 may correspond to the fifth and sixth preset slots 525 and 526. The sixth indictor 736 may correspond to the eighth preset slot 528.

Figure 8:
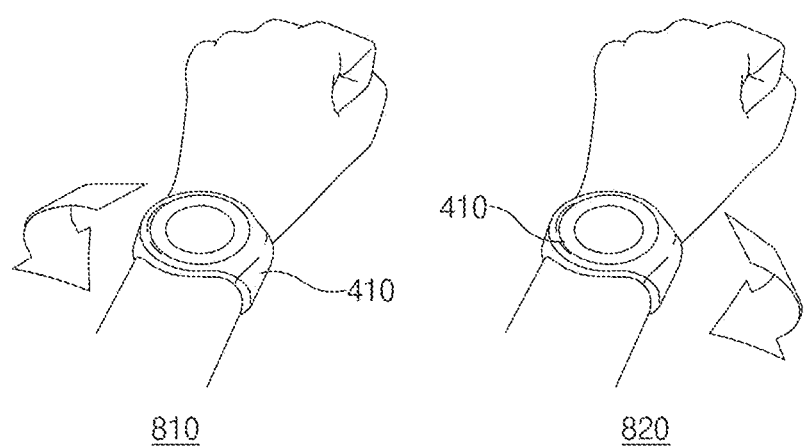
FIG. 8 is a view illustrating the movement of the wearable electronic device, according to various embodiments of the present invention.

FIG. 8 is a view illustrating the movement of the wearable electronic device, according to various embodiments of the present invention.

Referring to FIG. 8, the wearable electronic device 410 may be naturally rotated clockwise or counterclockwise in the state that the wearable electronic device 410 is put on the wrist of the user. In other words, the wearable electronic device 410 may be rotated counterclockwise (embodiment 810) or clockwise (embodiment 820) about the wrist of the user serving as one rotation axis. In this case, the rotation angle, at which the wearable electronic device 410 is rotated, may be transmitted as movement data to the electronic device 400.

In the case of the embodiment 810, the pointer 565 may move leftward on the second application screen 550. In the case of the embodiment 820, the pointer 565 may move rightward on the second application screen 550.

FIG. 9 is a view illustrating the movement of the wearable electronic device, according to various embodiments of the present invention.

Referring to FIG. 9, the wearable electronic device 410 may be rotated upward or downward about the elbow of the user in the state that the wearable electronic device 410 is put on the wrist of the user. In other words, the wearable electronic device 410 may be rotated upward (see embodiment 920) or downward (see embodiment 930) from a first state 910 while employing the elbow of the user as the center of the rotation. In this case, the rotation angle, at which the wearable electronic device 410 is rotated, may be transmitted as movement data to the electronic device 400.

In the case of the embodiment 920, the pointer 565 may move upward on the second application screen 550. In the case of the embodiment 930, the pointer 565 may move downward on the second application screen 550.

Figure 10:
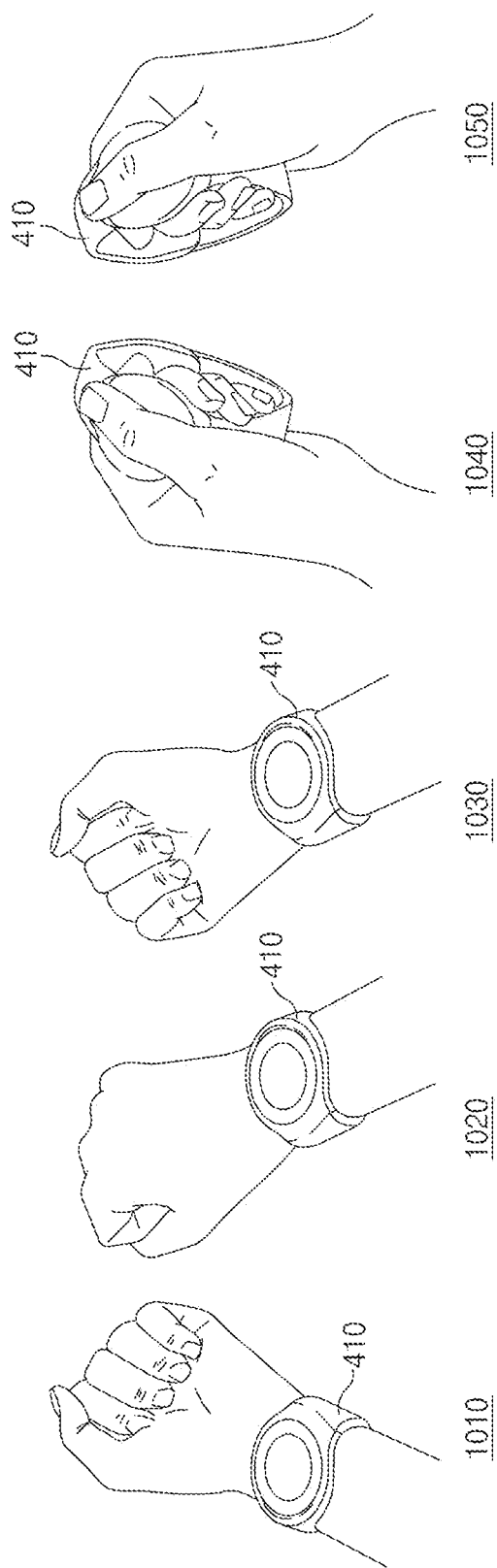
FIG. 10 is a view illustrating a manner of wearing the wearable electronic device, according to various embodiments of the present invention.

FIG. 10 is a view illustrating a manner of wearing the wearable electronic device, according to various embodiments of the present invention.

The description made with reference to FIGS. 8 and 9 is about the case that the wearable electronic device 410 is put on the left wrist of the user. However, according to various embodiments of the present invention, the wearable electronic device 410 may be put on the user or held by the user in various manners.

Referring to embodiment 1010 to embodiment 1050, the wearable electronic device 410 may be put on an inner part of the left wrist, an outer part of the right wrist, or an inner part of the right wrist of the user, or may be held by the left hand or the right hand of the user.

Figure 11:
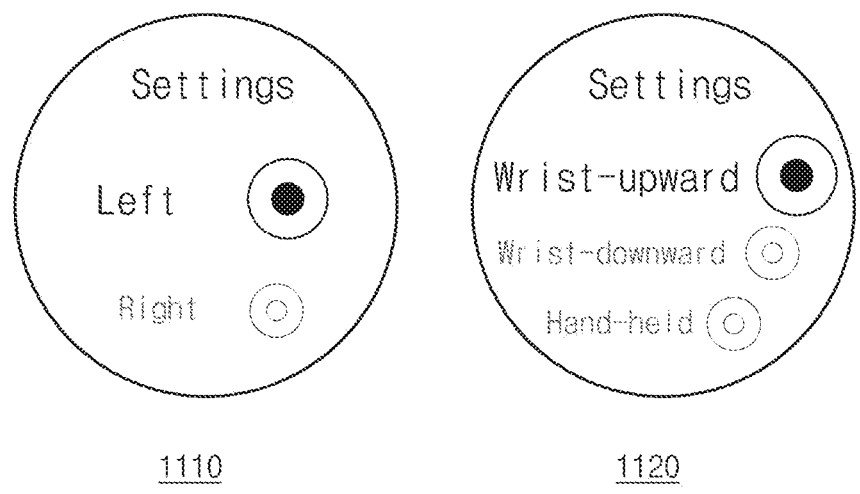
FIG. 11 illustrates a wearing manner graphic UI allowing a user to select a manner of wearing the wearable electronic device, according to various embodiments of the present invention.

FIG. 11 illustrates a wearing manner graphic UI allowing a user to select a manner of wearing the wearable electronic device, according to various embodiments of the present invention.

Various manners of wearing or holding the wearable electronic device 410 have been described with reference to FIGS. 9 and 10.

In the following description, the case of FIG. 9 that the wearable electronic device 410 is put on the outer part of the left wrist of the user will be compared with the case of embodiment 1010 of FIG. 10 that the wearable electronic device is put on the inner part of the left wrist of the user.

When the wearable electronic device 410 is put on the outer part of the left wrist of the user, the wearable electronic device 410 may be more easily rotated clockwise rather than counterclockwise. When the wearable electronic device 410 is put on the inner part of the left wrist of the user, the wearable electronic device 410 may be more easily rotated counterclockwise rather than clockwise.

Accordingly, the electronic device 400 may set the movement degree of the pointer 565 on the second application screen 550 differently based on the state that the wearable electronic device 410 is put on. For example, it may be assumed that the wearable electronic device 410 is put on the outer part of the left wrist of the user and is rotated clockwise and counterclockwise at the same degree. In this case, the electronic device 400 may increase the movement distance of the pointer 565, when the wearable electronic device 410 is rotated clockwise, to be longer than the movement distance of the pointer 565 when the wearable electronic device 410 is rotated counterclockwise. This is because the clockwise rotation of the wearable electronic device 410 is more difficult.

The wearable electronic device 410 has to notify the wearing state of the wearable electronic device 410 to the electronic device 400 for the above operation. Accordingly, the wearable electronic device 410 may provide the wearing manner graphic UI allowing the user to select a manner of wearing the wearable electronic device 410 through the display 411.

It may be determined through a first screen 1110 of the wearing manner graphic UI that the wearable electronic device 410 is positioned at the right side or the left side of the user. In addition, it may be determined through a second screen 1120 of the wearing manner graphic UI that the wearable electronic device 410 is positioned at the outer part of the wrist, positioned at the inner part of the wrist, or held by the hand.

According to various embodiments of the present invention, the above description will be applied to the case that the wearable electronic device 410 is rotated upward or downward, in addition to the case that the wearable electronic device 410 is rotated clockwise or counterclockwise. This is because the upward rotation of the wearable electronic device 410 is easier but the downward rotation of the wearable electronic device 410 is more difficult. Accordingly, the electronic device 400 may decrease the movement distance of the pointer 565, when the wearable electronic device 410 is rotated upward, to be shorter than the movement distance of the pointer 565 when the wearable electronic device 410 is rotated downward at the same degree as that of the upward rotation.

According to various embodiments of the present invention, an electronic device may include a communication circuit to perform communication; a sensor circuit to sense movement of the wearable electronic device; a processor electrically connected with the communication circuit and the sensor circuit, in which the processor transmits movement data of the wearable electronic device, which is obtained through the sensor circuit, to an electronic device through the communication circuit, and the transmitted movement data of the wearable electronic device allows the electronic device to control a loop application, which is being executed in the electronic device.

According to various embodiments of the present invention, the device may further include; a user input circuit electrically connected with the processor, and the processor activates the communication circuit based on a user input received through the user input circuit, and transmits the movement data to the electronic device through the activated communication circuit.

According to various embodiments of the present invention, the user input circuit may receive a touch input or a bezel input through bezel rotation by using a touch panel or a bezel.

According to various embodiments of the present invention, the movement data may be obtained by using at least one of a gyro sensor and an acceleration sensor.

According to various embodiments of the present invention, the device may further include; a display circuit electrically connected with the processor, and the processor provides a wearing manner graphic user interface (UI) for a manner of wearing the wearable electronic device to a display of the wearable electronic device through the display circuit.

According to various embodiments of the present invention, the wearing manner graphic UI may be used to select whether the wearable electronic device is positioned at a left side or a right side of a user.

According to various embodiments of the present invention, the wearing manner graphic UI may be used to select whether the wearable electronic device is put on an outer part of a wrist of a user, is put on an inner part of the wrist of the user, or is held by a hand of the user.

According to various embodiments of the present invention, the processor may transmit a result, which is selected through the wearing manner graphic UI, to the electronic device through the communication circuit.

According to various embodiments of the present invention, the loop application may include a first execution screen for determining a plurality of instruments, which are to be repeatedly played through the loop application, and a second execution screen for applying a sound effect to the determined instruments, wherein mutually different sound effects are applied depending on a position of a pointer, which is displayed by selecting one point on a second dimensional (2D) plane. The bezel input is used to change a plurality of presets in which the instruments are determined, on the first execution screen, and the movement data may be used to move the position of the pointer on the 2D plane of the second execution screen.

According to various embodiments of the present invention, the movement data may include a first rotation direction and a second rotation direction, and the first rotation direction may be to move the pointer in a first direction on the 2D plane, and the second rotation direction may be to move the pointer in a second direction perpendicular to the first direction on the 2D plane.

According to various embodiments, the pointer may start moving from the center of the 2D plane or start moving from a position corresponding to a direction of the wearable electronic device.

According to various embodiment, the processor may display, on a display of the wearable electronic device, objects in number corresponding to the number of the presets through a display circuit, and apply, to the object, an indicator for distinguishing a preset selected based on the bezel input from a preset which is not selected based on the bezel input.

According to various embodiments of the present invention, the movement data may be applied to the loop application in a state that slight movement is removed through a Moving average filter or low pass filter.

According to various embodiments of the present invention, based on the manner of wearing the wearable electronic device, movements of the pointer in the first rotation direction of the wearable electronic device and in a direction reverse to the first rotation direction; and movements of the pointer in the second rotation direction and a direction reverse to the second rotation direction are applied at mutually different movement speeds through the loop application.

Figure 12:
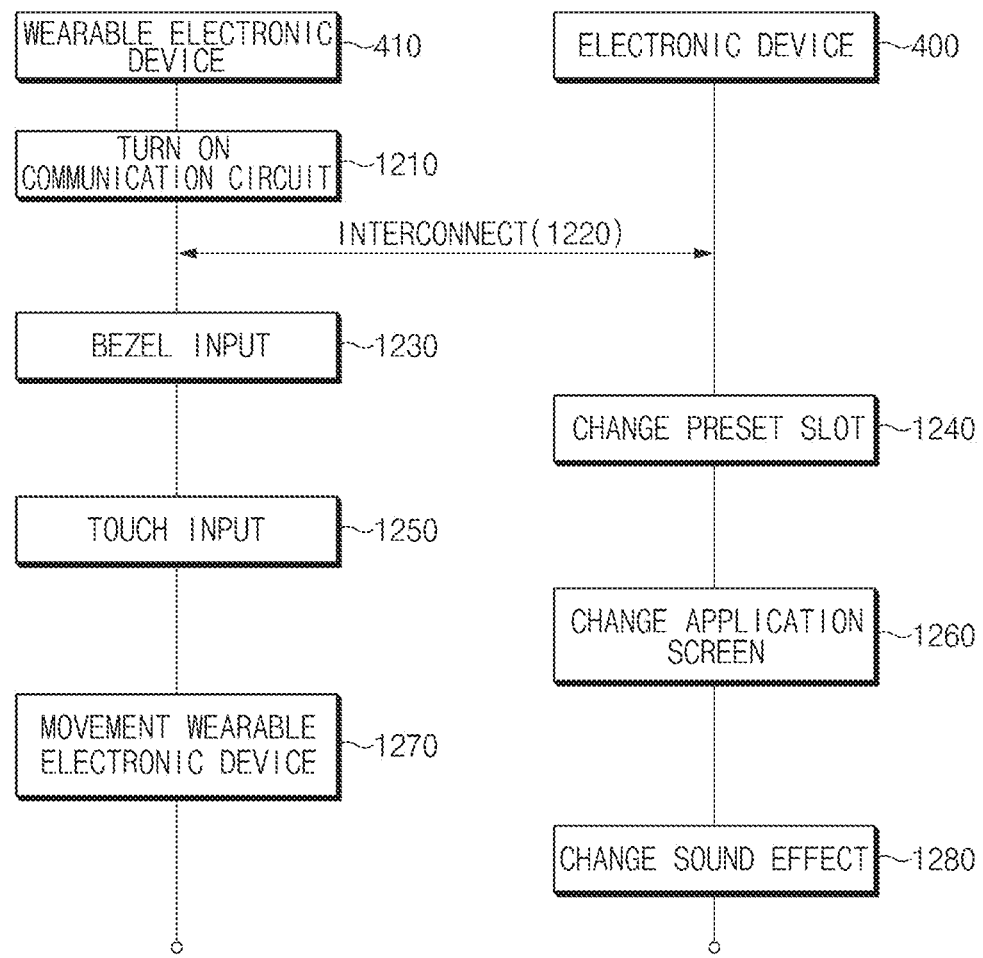
FIG. 12 is a flowchart illustrating the operation performed in the electronic device and the wearable electronic device, according to various embodiments of the present invention.

FIG. 12 is a flowchart illustrating operations performed by an electronic device and a wearable electronic device, according to various embodiments of the present invention. The operations performed by the electronic device and the wearable electronic device, which are illustrated in FIG. 12, may be performed by the electronic device 400 and the wearable electronic device 410 described with reference to FIGS. 1 to 11. Accordingly, although not illustrated in FIG. 12, the operations performed by the electronic device 400 and the wearable electronic device 410, which have been described with reference to FIGS. 1 to 122, may be applied to the operations performed by the electronic device and the wearable electronic device of FIG. 12.

It is assumed in FIG. 12 that the electronic device 400 performs the loop application and the first application screen 500 is displayed.

In operation 1210, the wearable electronic device 410 may activate a communication circuit. The communication circuit may be activated based on a swipe input into the display of the wearable electronic device 410.

In operation 1220, the electronic device 400 may interconnect with the wearable electronic device 410. Accordingly, the movement data of the electronic device 410 in the following operations may be transmitted to the electronic device 400. According to various embodiments of the present invention, the electronic device 400 may control the loop application such that the first application screen 500 is displayed, based on the interconnection in operation 1220.

In operation 1230, the wearable electronic device 410 may receive a bezel input made by rotating the bezel.

In operation 1240, the electronic device 400 may change a preset slot in which instruments to be repeatedly played through the loop application are set, based on the bezel input received in operation 1230.

In operation 1250, the wearable electronic device 410 may receive a touch input, for example, a swipe input, through a display.

In operation 1260, the electronic device 400 may switch the first application screen 500 to the second application screen 550, based on the swipe input received in operation 1250.

In operation 1270, the wearable electronic device 410 may move or rotate in various directions.

In operation 1280, the electronic device 400 may change a sound effect based on the movement of the wearable electronic device 410 preformed in operation 1270.

According to various embodiments of the present invention, the electronic device 400 may perform operation 1280 through operation 1270 even if the loop application does not display the second application screen 550 through operation 1250 and operation 1260.

According to various embodiments of the present invention, the method may include obtaining movement data of the wearable electronic device; and transmitting the obtained movement data to an electronic device. The transmitted movement data of the wearable electronic device allows the electronic device to control a loop application, which is being executed in the electronic device.

According to various embodiments of the present invention, the method may further include activating a communication circuit based on a user input received from a user. The movement data transmitted to the electronic device may be performed through the activated communication circuit.

According to various embodiments of the present invention, the movement data may be obtained by using at least one of a gyro sensor and an acceleration sensor.

According to various embodiments of the present invention, the user input includes a touch input or a bezel input which is received by using a touch panel or a bezel of the wearable electronic device.

According to various embodiments of the present invention, the loop application may include a first execution screen for determining a plurality of instruments, which are to be repeatedly played through the loop application, and a second execution screen for applying a sound effect to the determined instruments, wherein mutually different sound effects are applied depending on a position of a pointer, which is displayed by selecting one point on a second dimensional (2D) plane. The bezel input is used to change a plurality of presets in which the instruments are determined, on the first execution screen, and the movement data may be used to move the position of the pointer on the 2D plane of the second execution screen.

According to various embodiments of the present invention, in a medium storing computer-readable instructions, which are executed by at least one processor and readable by a computer, the instructions cause the at least one processor to obtain movement data of the wearable electronic device and to transmit the obtained movement data to the electronic device. The transmitted movement data of the wearable electronic device allows the electronic device to control the loop application executed in the electronic device.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. An instruction, when executed by a processor (e.g., the processor 120), may cause one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

410: wearable electronic device
411: display
412: bezel
413: sensor circuit
414: display circuit
415: user input circuit
416: communication circuit
417: processor
418: memory

The invention claimed is:

1. A wearable electronic device, comprising:
a communication circuit configured to perform communication;
a sensor circuit configured to sense movement of the wearable electronic device;
a processor electrically connected with the communication circuit and the sensor circuit; and
a display circuit electrically connected with the processor,
wherein the processor is configured to:
transmit movement data of the wearable electronic device, which is obtained through the sensor circuit, to an electronic device through the communication circuit,
provide a wearing manner graphic user interface (UI) for a manner of wearing the wearable electronic device to a display of the wearable electronic device through the display circuit; and
transmit a result, which is selected through the wearing manner graphic UI, to the electronic device through the communication circuit,
wherein the transmitted movement data of the wearable electronic device allows the electronic device to control a loop application which is being executed in the electronic device,
wherein a pointer is positioned on an execution screen of the loop application based on the transmitted movement data,
wherein a sound effect of the loop application is applied differently based on the position of the pointer,
wherein the transmitted movement data includes at least one of a first rotation angle or a second rotation angle of the wearable electronic device,
wherein a rotation axis of the first rotation angle is a wrist of a user of the wearable electronic device, and
wherein a center of the second rotation angle is an elbow of the user.

2. The wearable electronic device of claim 1, further comprising:
a user input circuit electrically connected with the processor,
wherein the processor is configured to:
activate the communication circuit based on a user input received through the user input circuit; and
transmit the movement data to the electronic device through the activated communication circuit.

3. The wearable electronic device of claim 2, wherein the user input circuit receives a touch input or a bezel input through bezel rotation by using a touch panel or a bezel.

4. The wearable electronic device of claim 1, wherein the movement data is obtained by using at least one of a gyro sensor and an acceleration sensor.

5. The wearable electronic device of claim 1, wherein the wearing manner graphic UI is to select whether the wearable electronic device is positioned at a left side or a right side of the user.

6. The wearable electronic device of claim 1, wherein the wearing manner graphic UI is to select whether the wearable electronic device is put on an outer part of the wrist of the user, is put on an inner part of the wrist of the user, or is held by a hand of the user.

7. The wearable electronic device of claim 3, wherein the loop application includes a first execution screen for determining a plurality of instruments which are to be repeatedly played through the loop application, and a second execution screen for applying sound effects to the determined instruments,
wherein different sound effects are applied depending on the position of the pointer which is displayed by selecting one point on a second dimensional (2D) plane,
wherein the bezel input is used to change a plurality of presets in which the instruments are determined, on the first execution screen, and
wherein the movement data is used to move the position of the pointer on the 2D plane of the second execution screen.

8. The wearable electronic device of claim 7, wherein the movement data includes a first rotation direction and a second rotation direction, and
wherein the first rotation direction is to move the pointer in a first direction on the 2D plane, and the second rotation direction is to move the pointer in a second direction perpendicular to the first direction on the 2D plane.

9. The wearable electronic device of claim 7, wherein the pointer starts moving from a center of the 2D plane or starts moving from a position corresponding to a direction which the wearable electronic device faces.

10. The wearable electronic device of claim 7, wherein the processor is configured to:
display, on the display of the wearable electronic device, objects in number corresponding to the number of the presets, through the display circuit; and
apply, to the object, an indicator for distinguishing a preset selected based on the bezel input from a preset which is not selected based on the bezel input.

11. The wearable electronic device of claim 7, wherein the movement data is applied to the loop application in a state that slight movement is removed through a moving average filter or low pass filter.

12. The wearable electronic device of claim 8, wherein, based on a manner of wearing the wearable electronic device,
movements of the pointer in the first rotation direction of the wearable electronic device and in a direction reverse to the first rotation direction; and movements of the pointer in the second rotation direction and a direction reverse to the second rotation direction are applied at mutually different movement speeds to the loop application.

13. A method performed in a wearable electronic device, the method comprising:
   displaying a wearing manner graphic user interface (UI) for a manner of wearing the wearable electronic device;
   transmitting a result, which is selected through the wearing manner graphic UI, to an electronic device through the communication circuit;
   obtaining movement data of the wearable electronic device;
   transmitting the obtained movement data to the electronic device,
   wherein the transmitted movement data of the wearable electronic device allows the electronic device to control a loop application which is being executed in the electronic device,
   wherein a pointer is positioned on an execution screen of the loop application based on the transmitted movement data,
   wherein a sound effect of the loop application is applied differently based on the position of the pointer,
   wherein the transmitted movement data includes at least one of a first rotation angle or a second rotation angle of the wearable electronic device,
   wherein a rotation axis of the first rotation angle is a wrist of a user of the wearable electronic device, and
   wherein a center of the second rotation angle is an elbow of the user.

* * * * *